(12) United States Patent
Ito

(10) Patent No.: US 10,266,013 B2
(45) Date of Patent: Apr. 23, 2019

(54) PNEUMATIC TIRE

(71) Applicant: Sumitomo Rubber Industries, Ltd., Kobe-shi, Hyogo (JP)

(72) Inventor: Tadashi Ito, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 79 days.

(21) Appl. No.: 15/024,465

(22) PCT Filed: Oct. 2, 2014

(86) PCT No.: PCT/JP2014/076393
§ 371 (c)(1),
(2) Date: Mar. 24, 2016

(87) PCT Pub. No.: WO2015/056573
PCT Pub. Date: Apr. 23, 2015

(65) Prior Publication Data
US 2016/0243898 A1    Aug. 25, 2016

(30) Foreign Application Priority Data

Oct. 17, 2013 (JP) .................... 2013-216619

(51) Int. Cl.
*B60C 11/03* (2006.01)
*B60C 11/11* (2006.01)
*B60C 11/12* (2006.01)
*B60C 11/01* (2006.01)

(52) U.S. Cl.
CPC ........ *B60C 11/0327* (2013.01); *B60C 11/033* (2013.01); *B60C 11/0306* (2013.01);
(Continued)

(58) Field of Classification Search
CPC . B60C 11/0327; B60C 11/0306; B60C 11/11; B60C 11/1236; B60C 11/033;
(Continued)

(56) References Cited

U.S. PATENT DOCUMENTS

2012/0006456 A1* 1/2012 Koshio .................. B60C 11/11
152/209.18
2012/0305155 A1 12/2012 Hamanaka

FOREIGN PATENT DOCUMENTS

DE     102012209246 A1  12/2012
JP       6-227211 A      8/1994
(Continued)

OTHER PUBLICATIONS

Aoki et al., JP H06227211—Machine translation.*
(Continued)

*Primary Examiner* — Matthew J Daniels
*Assistant Examiner* — Yunju Kim
(74) *Attorney, Agent, or Firm* — Birch, Stewart, Kolasch & Birch LLP

(57) ABSTRACT

A pneumatic tire in which a tread part is provided with a pair of central main grooves extending continuously around the circumference of the tire on both sides of a tire equator C, and central thin grooves extending continuously around the circumference of the tire on the tire-axially inner sides of the central main grooves and having less groove width than the central main grooves. The central thin grooves include a linear first central thin groove running along the tire circumference, and zigzagging second central thin grooves. The first central thin groove is provided on the tire-axially inner sides of the second central thin grooves.

20 Claims, 4 Drawing Sheets

(52) U.S. Cl.
CPC ........... *B60C 11/11* (2013.01); *B60C 11/1236* (2013.01); *B60C 11/12* (2013.01); *B60C 2011/013* (2013.01); *B60C 2011/0334* (2013.01); *B60C 2011/0344* (2013.01); *B60C 2011/0346* (2013.01); *B60C 2011/0348* (2013.01); *B60C 2011/0353* (2013.01); *B60C 2011/0355* (2013.01); *B60C 2011/0358* (2013.01); *B60C 2011/0365* (2013.01); *B60C 2011/0367* (2013.01); *B60C 2011/0393* (2013.01); *B60C 2011/129* (2013.01); *B60C 2011/1209* (2013.01)

(58) Field of Classification Search
CPC ............... B60C 11/12; B60C 2011/013; B60C 2011/0334; B60C 2011/0344; B60C 2011/0346; B60C 2011/0355; B60C 2011/0358; B60C 2011/0367; B60C 2011/0393; B60C 2011/1209; B60C 2011/129

USPC .......................................... 152/209.1, 209.18
See application file for complete search history.

(56) References Cited

FOREIGN PATENT DOCUMENTS

| | | |
|---|---|---|
| JP | 2009-241882 A | 10/2009 |
| JP | 2012-158192 A | 8/2012 |

OTHER PUBLICATIONS

International Search Report for PCT/JP2014/076393 dated Dec. 22, 2014.
Written Opinion of the International Searching Authority for PCT/JP2014/076393 (PCT/ISA/237) dated Dec. 22, 2014.
Extended European Search Report dated May 11, 2017, for European Application No. 14853212.0.

* cited by examiner

PNEUMATIC TIRE

TECHNICAL FIELD

The present invention relates to a pneumatic tire that combines on-ice performance and wear resistance.

BACKGROUND ART

Conventionally, to improve a running performance on ice (hereinafter, referred to as an "on-ice performance"), a pneumatic tire including a tread block with a sipe has been proposed. Such a pneumatic tire can exhibit the on-ice performance by an action of scratching the ground using edges of the sipe (hereinafter, referred to as an "edge effect"), and a water-absorption effect and the like.

Unfortunately, the tire provided with the sipe has a problem that the wear resistance is reduced since the rigidity of a land portion is reduced.

The following Patent Document 1 proposes a pneumatic tire including axially extending lateral grooves arranged at improved pitches. In such a pneumatic tire, rubber chipping of a block between lateral grooves is suppressed. Thus, wear resistance of the land portions can be improved.

Patent Document 1: Japanese Unexamined Patent Application Publication No. 2012-158192

DISCLOSURE OF THE INVENTION

Problems that the Invention is to Solve

Unfortunately, even in the pneumatic tire according to Patent Document 1, there is room for further improvement in order to improve both of the on-ice performance and the wear performance.

The present invention has been devised in view of the circumstances as described above, and has a main object to provide a pneumatic tire that combines the on-ice performance and the wear resistance by improving an arrangement of grooves extending in the circumferential direction of the tire.

Means for Solving the Problems

The present invention provides a pneumatic tire comprising a tread portion being provided with a pair of circumferentially and continuously extending central main grooves on both sides of a tire equator and a circumferentially and continuously extending central narrow groove disposed axially inward of the central main grooves and having a groove width smaller than that of the central main grooves, the central narrow groove comprising a first central narrow groove extending in a straight shape along a circumferential direction of the tire and a second central narrow groove extending in a zigzag shape, and the first central narrow groove being disposed axially inward of the second central narrow groove.

In the pneumatic tire according to the present invention, it is preferable that the first central narrow groove is disposed on the tire equator, and that a pair of the second central narrow grooves are disposed on axially both sides of the first central narrow groove.

In the pneumatic tire according to the present invention, it is preferable that the tread portion is provided with an inner central land portion between the first central narrow groove and the second central narrow groove, that the central land portion is divided into a plurality of inner central blocks by a plurality of inner central lateral grooves communicating between a first apex portion of the second central narrow groove which protrudes axially inwardly and the first central narrow groove, and that ground contact surfaces of the inner central blocks are substantially pentagonal.

In the pneumatic tire according to the present invention, it is preferable that the central main groove has a zigzag shape, that the tread portion is provided with an outer central land portion between the second central narrow groove and the central main groove, that the central land portion is divided into a plurality of outer central blocks by a plurality of outer central lateral grooves communicating between a second apex portion of the second central narrow groove which protrudes axially outwardly and a first apex portion of the central main groove which protrudes axially inwardly, and that ground contact surfaces of the outer central blocks are substantially hexagonal.

In the pneumatic tire according to the present invention, it is preferable that the tread portion is provided with a circumferentially and continuously extending shoulder narrow groove disposed axially outward of the central main grooves, and the shoulder narrow groove extends in a zigzag shape in the circumferential direction of the tire.

In the pneumatic tire according to the present invention, it is preferable that the central main groove has a zigzag shape, that the tread portion is provided with an inner shoulder land portion between the central main groove and the shoulder narrow groove, that the inner shoulder land portion is divided into a plurality of inner shoulder blocks by a plurality of inner shoulder lateral grooves communicating between a first apex portion of the shoulder narrow groove which protrudes axially inwardly and a second apex portion of the central main groove which protrudes axially outwardly, and that ground contact surfaces of the inner shoulder blocks are substantially hexagonal.

In the pneumatic tire according to the present invention, it is preferable that the tread portion is provided with an outer shoulder land portion disposed axially outward of the shoulder narrow groove, that the outer shoulder land portion is divided into a plurality of outer shoulder blocks by a plurality of outer shoulder lateral grooves communicating between a second apex portion of the shoulder narrow groove which protrudes axially outwardly and a tread ground contact end, and that ground contact surfaces of the outer shoulder blocks are substantially pentagonal.

Effect of the Invention

The pneumatic tire of the present invention includes the tread portion provided with a pair of circumferentially and continuously extending central main grooves on both sides of the tire equator, and a circumferentially and continuously extending central narrow groove disposed on axially inward of the central main grooves and having a width smaller than the central main grooves. Owing to the central narrow groove, the rigidity of a land portion between the central main grooves in which large ground contact pressure acts is maintained, and the wear resistance is maintained.

The central narrow groove includes a first central narrow groove extending along the tire circumferential direction and a second central narrow groove extending in a zigzag shape. These first central narrow groove and second central narrow groove can exhibit excellent edge effect, and can improve the on-ice performance.

The first central narrow groove is disposed axially inward of the second central narrow groove. That is, the first central narrow groove is disposed on the side of the tire equator of the tread portion on which a large ground pressure acts. Thus, when running on ice, an edge component extending in the circumferential direction of the tire of the first central narrow groove can exhibit a large frictional force in the axial direction of the tire. Moreover, when cornering, zigzag edges of both second central narrow grooves 6 are engaged one another. Thus, land portions disposed on both sides of the second central narrow groove 6 are integrated, and the rigidity of the land portion between the central main groove and the first central narrow groove is improved. Therefore, the pneumatic tire according to the present invention can improve the wear resistance.

As described above, the pneumatic tire of the present invention can achieve both the on-ice performance and the wear resistance.

REFERENCE SIGNS LIST

2 Tread portion
3 Central main groove
4 Central narrow groove 4
5 First central narrow groove
6 Second central narrow groove

BEST MODE FOR CARRYING OUT THE INVENTION

Figure 1:
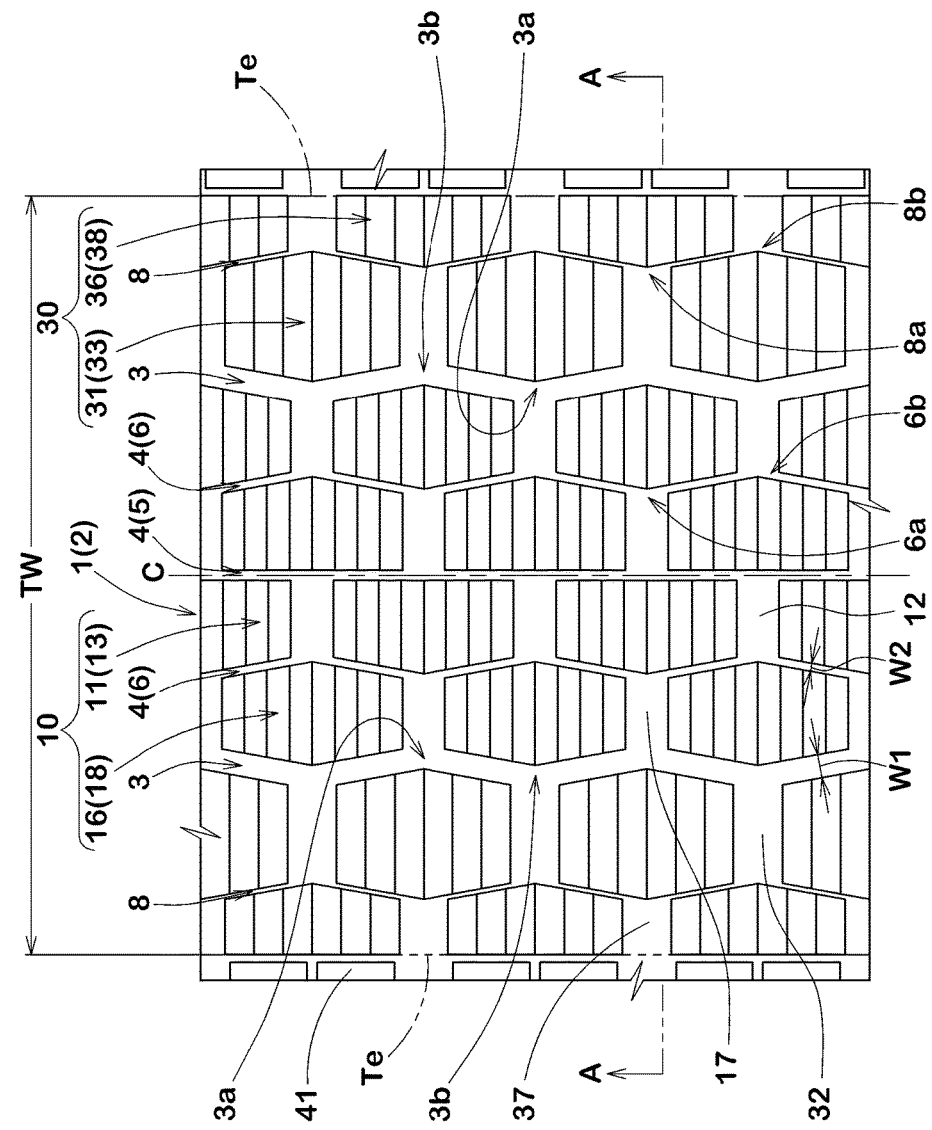
FIG. 1 is a development view of a tread portion of a pneumatic tire of the present embodiment.

Hereinafter, an embodiment of the present invention will be described with reference to the accompanying drawings. FIG. 1 illustrates a tread portion 2 of a pneumatic tire 1 of the present embodiment (hereinafter, simply referred to as a "tire"). The pneumatic tire 1 of the present embodiment may be preferably used as a heavy duty pneumatic tire for winter.

As illustrated in FIG. 1, the tread portion 2 includes a central main groove 3 and a central narrow groove 4.

A pair of central main grooves 3 are provided on both sides of the tire equator C. The central main grooves 3 extend continuously in the circumferential direction of the tire. Accordingly, the tread portion 2 is divided into a central land portion 10 disposed axially inward of the central main grooves 3 and shoulder land portions 30 disposed axially outward of the central main grooves 3.

The central main grooves 3 of the present embodiment include a first apex portion 3a protruding axially inwardly and a second apex portion 3b protruding axially outwardly. The first apex portion 3a and the second apex portion 3b are provided alternately in the circumferential direction, thereby forming the central main grooves 3 having a zigzag shape.

Groove widths W1 of the central main grooves 3 are in a range of from 2.5% to 5.0% of a tread ground width TW, for example. Such a central main groove 3 can maintain the rigidity of the tread portion 2, and can exhibit an excellent drainage performance.

The tread ground width TW is an axial distance between tread ground ends Te and Te of the tire 1 in a normal state.

The normal state means that the tire is mounted on a normal rim (not shown) with a normal internal pressure, but is loaded with no tire load.

The "normal rim" is a rim determined for each tire by a standard including one on which the tire is based. For example, it is a "standard rim" in the case of JATMA, a "Design Rim" in the case of TRA, and a "Measuring Rim" in the case of ETRTO.

The "normal internal pressure" means an air pressure determined for each tire by the standard. For example, it is the maximum air pressure in JATMA, the maximum value described in a table "TIRE LOAD LIMITS AT VARIOUS COLD INFLATION PRESSURES" in the case of TRA, and the "INFLATION PRESSURE" in the case of ETRTO.

The above-mentioned "tread ground end Te" is defined as an axially outer most ground position when the tire 1 is grounded to a plane at a camber angle of zero degree with the normal road in the normal state.

The "normal load" is a load determined for each tire by the standard. For example, it is the maximum load ability in the case of JATMA, the maximum value described in a Table "TIRE LOAD LIMITS AT VARIOUS COLD INFLATION PRESSURES" in the case of TRA, and the "LOAD CAPACITY" in the case of ETRTO.

Figure 2:
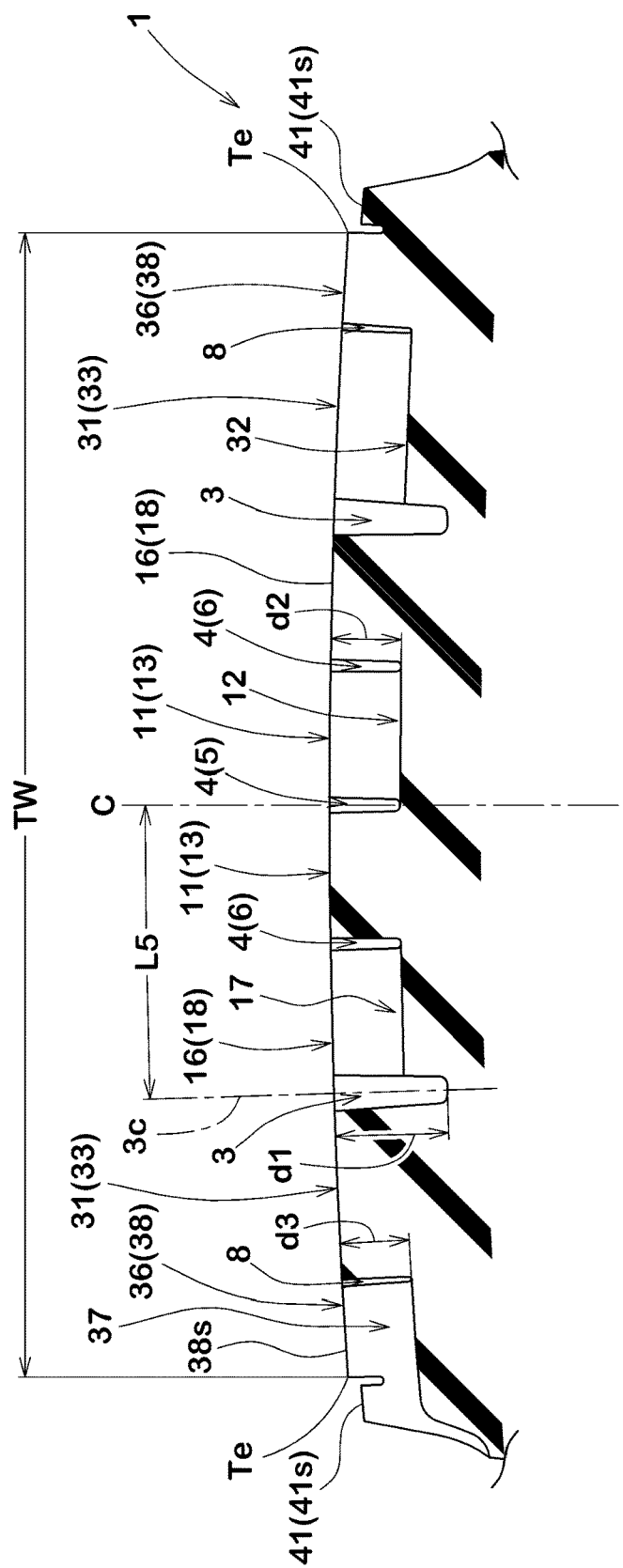
FIG. 2 is a cross-sectional view taken along line A-A of FIG. 1.

FIG. 2 a cross-sectional view along A-A line of FIG. 1. As illustrated in FIG. 2, groove depths d1 of the central main grooves 3 are in a range of from 10 to 25 mm, for example.

An axial distance L5 from the tire equator C to the groove central line 3c of each central main groove 3, for example, is preferably in a range of from 0.15 to 0.35 times of the tread ground width TW. Thus, an excellent wet performance can be exhibited while maintaining the rigidity of a central land portion 10 (shown in FIG. 1).

As illustrated in FIG. 1, the central narrow groove 4 extends continuously in the circumferential direction of the tire, and is located axially inward of the central main grooves 3. A groove width W2 of the central narrow groove is set to be smaller than a groove width W1 of the central main grooves 3. Owing to the central narrow groove 4, when a large ground contact pressure is applied to the tread portion 2, groove walls of the central narrow groove 4 are deformed in contact with each other. Due to a contact with the groove walls of the central narrow groove 4, land portions disposed between the central main grooves 3, 3 can mutually support each other and improve the rigidity of the land portions. Thus, the wear resistance of the tire 1 is improved.

A ratio W2/W1 between the groove width W2 of the central narrow groove 4 and the groove widths W1 of the central main grooves 3 is preferably not less than 0.30, more preferably not less than 0.35, and preferably not more than 0.50, more preferably not more than 0.45. A groove depth d2 (shown in FIG. 2) of the central narrow groove 4, for example, is in a range of from 8 to 20 mm. Owing to the central narrow groove 4, an excellent edge effect can be exhibited while maintaining the rigidity of the central land portion 10.

The central narrow groove 4 includes a first central narrow groove 5 and a second central narrow groove 6. The first central narrow groove 5 is formed as a straight shape along the circumferential direction of the tire. The second central narrow groove 6 includes a first apex portion 6a protruding axially inwardly and a second apex portion 6b protruding axially outwardly. By providing alternately the first apex portion 6a and the second apex portion 6b, the second central narrow groove 6 is formed in a zigzag shape. The first central narrow groove 5 and the second central narrow groove 6 exhibit the excellent edge effect, and the performance on-ice can be improved.

The first central narrow groove 5 is disposed axially inward of the second central narrow groove 6. That is, the first central narrow groove 5 is disposed on the side of the tire equator C of the tread portion 2 on which a large ground pressure acts. When running on ice, a circumferential edge component of the first central narrow groove 5 can generate a large frictional force in the axial direction of the tire. When cornering, zigzag corners of both edges of the second central narrow groove 6 are engaged each other. Thus, land portions disposed on both sides of the second central narrow groove 6 are integrated. Therefore, the rigidity of the central land portion 10 is improved, and the wear resistance is improved.

The first central narrow groove 5 is preferably provided on the tire equator C. Thus, a larger ground pressure acts on the first central narrow groove 5, an excellent edge effect is exhibited. However, the present invention is not limited to such an aspect. The first central narrow groove 5, for example, may be provided on both sides of the tire equator C.

The second central narrow groove 6 is preferably provided on each side of the first central narrow groove 5. Owing to these pair of the second central narrow grooves 6, the rigidity distribution of the central land portion 10 is uniformed, and the uneven wear of the central land portion 10 can be inhibited.

Figure 3:
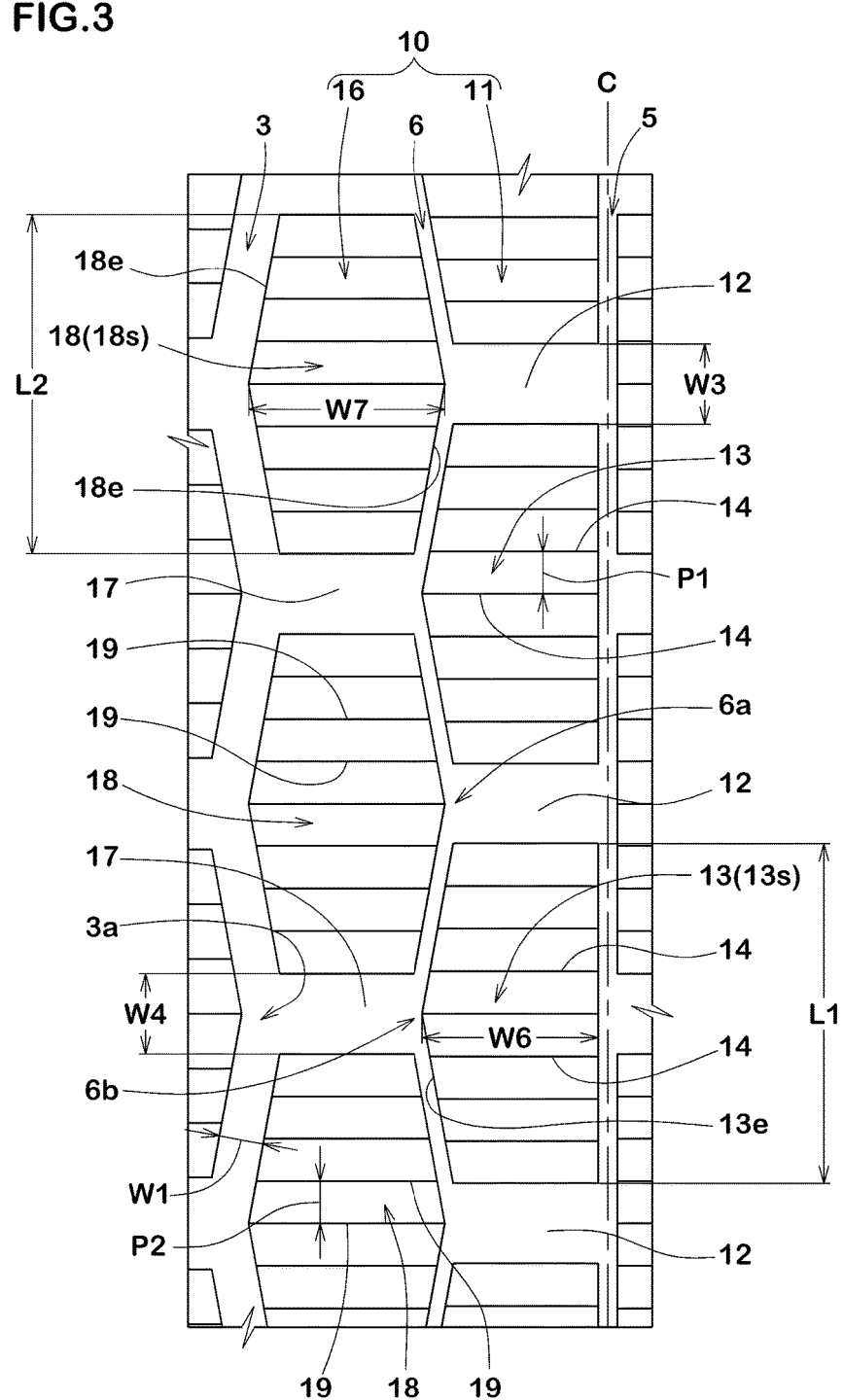
FIG. 3 is an enlarged cross-sectional view of a central land portion of FIG. 1.

FIG. 3 illustrates an enlarged view of the central land portion 10. As illustrated in FIG. 3, the central land portion 10 includes an inner central land portion 11 and an outer central land portion 16. The inner central land portion 11 is disposed between the first central narrow groove 5 and one of the second central narrow grooves 6. The outer central land portion 16 is disposed between the second central narrow groove 6 and one of the central main grooves 3.

In the inner central land portion 11, a plurality of inner central lateral grooves 12 are provided. Each of the inner central lateral grooves 12 communicates between the first apex portion 6a of the second central narrow groove 6 and the first central narrow groove 5. The inner central lateral grooves 12 extend straightly along the axial direction of the tire. Owing to the inner central lateral grooves 12, a large snow column shearing force is exhibited in the circumferential direction of the tire when traveling on snow, and a driving performance on snow (hereinafter, referred to as "on-snow performance") may be improved.

The groove width W3 of the inner central lateral grooves 12 is preferably not less than 1.65 times of the groove width W1 of the central main groove 3, more preferably not less than 1.70 times, and preferably not more than 1.85 times, more preferably not more than 1.80 times. Owing to these inner central lateral grooves 12, the steering stability on a dry road can be maintained and the on-snow performance can be improved.

Since the inner central land portion 11 includes the inner central lateral grooves 12, a plurality of inner central blocks 13 are defined. A ground contact surface 13s of each inner central block 13 is formed as a substantial pentagon having an axially outer edge 13e which protrudes.

A ratio W6/L1 of an axial width W6 of the ground contact surface 13s of the inner central block 13 to a circumferential length L1 is preferably not less than 0.45, more preferably not less than 0.50, and preferably not more than 0.60, more preferably not more than 0.55. When the ratio W6/L1 is less than 0.45, the axial rigidity of the inner central block 13 is reduced, and the steering stability may be deteriorated. Conversely, the ratio W6/L1 is more than 0.60, the circumferential rigidity of the inner central block 13 is lowered, and a traction performance on dry road may be deteriorated.

Preferably, the inner central block 13 is provided with a plurality of inner central sipes 14 communicating between the first central narrow groove 5 and the second central narrow groove 6. Such an inner central sipe 14 can offer an excellent edge effect and absorption effect to improve the on-ice performance. In the present description, the term "sipe" means, a cut having substantially no width extent not more than 1 mm, for example. Therefore, the sipe is distinguished from a groove for drainage.

Preferably, an interval P1 between a pair of circumferentially adjacent inner central sipes 14 and 14 is not less than 0.05 times of the length L1 of the inner central block 13, more preferably not less than 0.10 times, and preferably not more than 0.20 times, more preferably not more than 0.15 times. Owing to the inner central sipe 14, the wear resistance and the performance on-ice can be consistent.

The outer central land portion 16 is provided with a plurality of outer central lateral grooves 17. Each of the outer central lateral grooves 17 communicates between the second apex portion 6b of second central narrow groove 6 and the first apex portion 3a of the central main groove 3. The outer central lateral grooves 17 extend along the axial direction of the tire. These outer central lateral grooves may compress snow therein strongly when traveling on snow so as to generate a large snow column shearing force, thereby improving the snow performance.

A groove width W4 of the outer central lateral grooves 17, for example, is in a range of from 1.65 to 1.85 times of the groove width W1 of the central main groove 3. Preferably, the groove width W4 of the outer central lateral grooves 17 is the same as the groove width W3 of the inner central lateral grooves 12. The outer central lateral grooves 17 may improve the on-snow performance and suppress the uneven wear of the central land portion 10.

The outer central land portion 16 is divided into a plurality of outer central blocks 18 by the outer central lateral grooves 17. A ground contact surface 18s of each outer central block 18 is formed as a substantial hexagon having axially both edges 18e and 18e each of which protrudes.

Preferably, a ratio W7/L2 of an axial width W7 of the ground contact surface 18s of the outer central block 18 to a circumferential length L2 is not less than 0.50, more preferably mot less than 0.55, and preferably not more than 0.65, more preferably not more than 0.60. Owing to this outer central block 18, the rigidities of the block in the circumferential and axial directions of the tire are maintained in good balance, and the steering stability on a dry road can be improved.

Preferably, the outer central block 18 is provided with a plurality of outer central sipes 19 communicating between the second central narrow groove 6 and the central main groove 3. Owing to the outer central sipes 19, the on-ice performance can be effectively improved.

An interval P2 between a pair of circumferentially adjacent outer central sipes 19 and 19 is not less than 0.05 times of the length L2 of the outer central block 18, more preferably not less than 0.10 times, and not more than 0.20 times, more preferably not more than 0.15 times. The outer central sipe 19 may improve the on-ice performance while maintaining the wear resistance of the outer central block 18.

Figure 4:
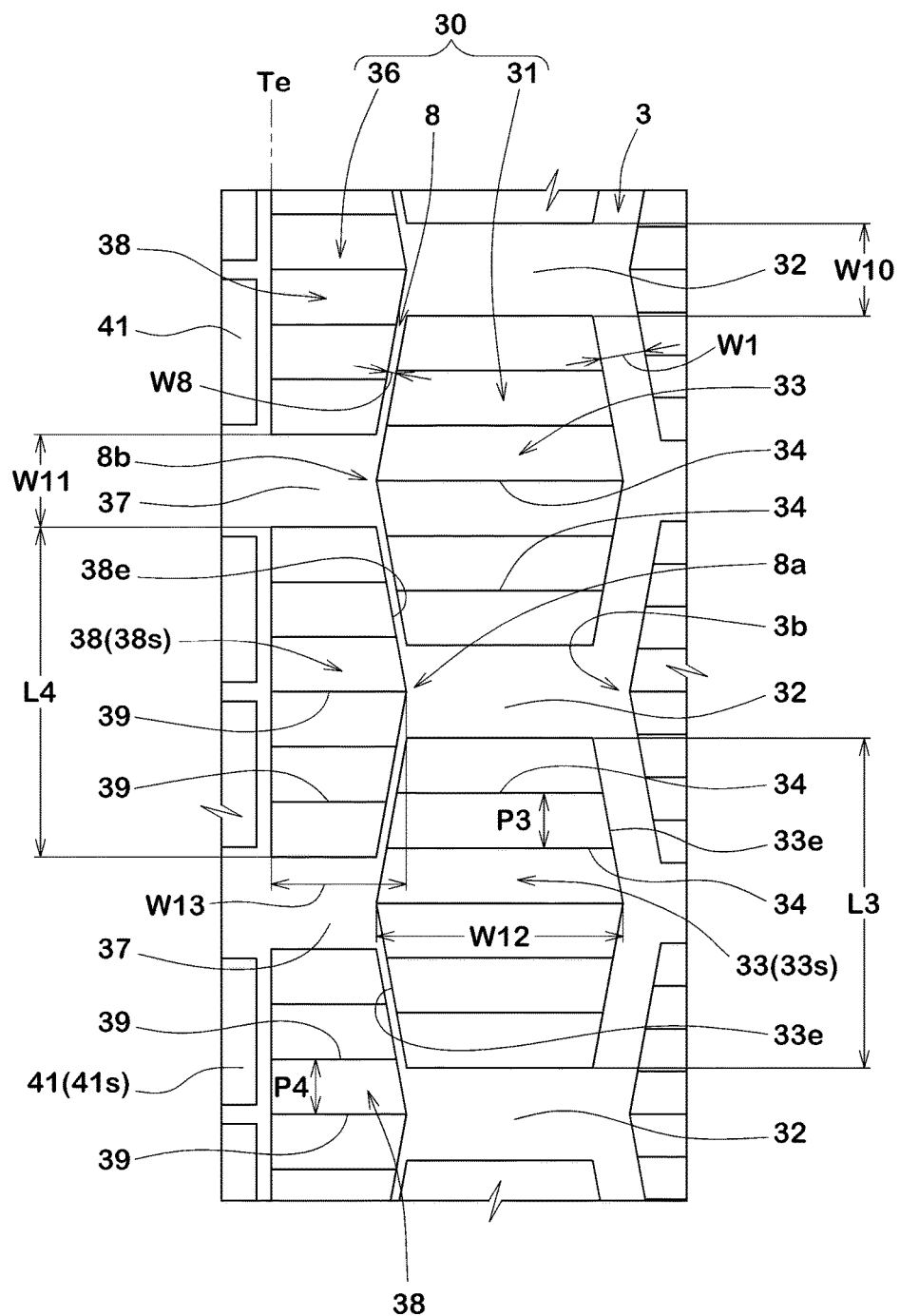
FIG. 4 is an enlarged cross-sectional view of a shoulder land portion of FIG. 1.

FIG. 4 illustrates an enlarged view of the shoulder land portion 30. The shoulder land portion 30 is provided with a shoulder narrow groove 8. The shoulder narrow groove 8 extends continuously in the circumferential direction of the tire and is located axially outward of the central main groove 3. The shoulder narrow groove 8 includes a first apex portion 8a protruding axially inwardly and a second apex portion 8b protruding axially outwardly. These first apex portion 6a and second apex portion 8b are provided alternately to form the shoulder narrow groove 8 having a zigzag shape.

A groove width W8 of the shoulder narrow groove 8, for example, is in a range of from 0.15 times to 0.20 times of the groove width W1 of the central main groove 3. The groove depth d3 (shown in FIG. 2) of the shoulder narrow groove 8, for example, is from 8 to 20 mm. When grounding, the groove walls of the shoulder narrow groove 8 are deformed in contact with each other. Due to a contact with the groove walls of the shoulder narrow groove 8, the rigidity of the shoulder land portion 30 is maintained, and an excellent edge effect can be exhibited.

The shoulder land portion 30 is divided into an inner shoulder land portion 31 and an outer shoulder land portion 36 by the shoulder narrow groove 8. The inner shoulder land portion 31 is disposed between the central main groove 3 and the shoulder narrow groove 8. The outer shoulder land portion 36 is disposed between the shoulder narrow groove 8 and the tread ground end Te.

The inner shoulder land portion 31 is provided with a plurality of inner shoulder lateral grooves 32. Each of the inner shoulder lateral grooves 32 communicates between the first apex portion 8a of the shoulder narrow groove 8 and the second apex portion 3b of the central main groove 3. The inner shoulder lateral groove 32 extends straightly along the axial direction of the tire. The inner shoulder lateral grooves 32 may improve on-snow performance by generating a large snow column shearing force.

In order to exert such actions effectively, a groove width W10 of the inner shoulder lateral groove 32 is desirably larger than the groove width W4 (shown in FIG. 3) of the outer central lateral grooves 17. Furthermore, the groove width W10 of the inner shoulder lateral groove 32 is preferably not less than 1.10 times of the groove width W4 of the outer central lateral grooves 17, more preferably not less than 1.13 times, and preferably not more than 1.20 times, more preferably not more than 1.17 times. Owing to the inner shoulder lateral grooves 32, the on-snow performance can be improved while suppressing uneven wear near the central main groove 3.

The inner shoulder land portion 31 is divided into a plurality of inner shoulder blocks 33 by a plurality of inner shoulder lateral grooves 22. A ground contact surface 33s of each inner shoulder block 33 is substantially hexagonal, where axially both edges 33e and 33e protrude.

Preferably, a ratio W12/L3 of an axial width W12 of the ground contact surface 33s of each inner shoulder block 33 to a circumferential length L3 is not less than 0.50, more preferably not less than 0.55, and preferably not more than 0.65, more preferably not more than 0.60. Owing to the inner shoulder blocks 33, the rigidities in the tire circumferential and axial directions of the block are maintained in good balance, and the steering stability on a dry road can be improved.

Preferably, each of the inner shoulder blocks 33 is provided with a plurality of inner shoulder sipes 34 communicating between the central main groove 3 and the shoulder narrow groove 8. The inner shoulder sipe 34 may improve the on-ice performance effectively.

Preferably, an interval P3 between a pair of circumferentially adjacent inner shoulder sipes is larger than the interval P2 (shown in FIG. 3) of the outer central sipe 19. Owing to this inner shoulder sipe 34, the uneven wear of the shoulder land portion 30 is suppressed, and the on-ice performance can be improved. In order to exert such an effect effectively, the interval P3 of the inner shoulder sipe 34 is preferably not less than 1.15 times of the distance P2, more preferably not less than 1.20 times, and preferably not more than 1.35, more preferably not more than 1.30 times.

The outer shoulder land portion 36 is provided with a plurality of outer shoulder lateral grooves 37. Each of the outer shoulder lateral grooves 37 communicates between the second apex portion 8b of the shoulder narrow groove 8 and the tread ground end Te. The outer shoulder lateral groove 37 extends straightly along the axial direction of the tire. Owing to the outer shoulder lateral grooves 37, a large snow column shearing force can be generated in the tire circumferential direction when traveling on snow.

Groove widths W11 of the outer shoulder lateral groove 37 are in a range of from 1.10 to 1.20 times of a groove width W11 (shown in FIG. 3) of the outer central lateral grooves 17, for example. The groove widths W11 of the outer shoulder lateral groove 37 are preferably the same as the groove widths W10 of the inner shoulder lateral grooves 32. Owing to the outer shoulder lateral grooves 37, uneven wear of the shoulder land portion 30 can be effectively suppressed.

The outer shoulder land portion 36 is divided into a plurality of outer shoulder blocks 38 by a plurality of outer shoulder lateral grooves 37. A ground contact surface 38s of each of the outer shoulder blocks 38 is formed as a pentagon having an axially inner edge 38e which protrudes.

A ratio W13/L4 of an axial width 13 of the ground contact surface 38s of each outer shoulder block 38 to a circumferential length L4 is preferably not less than 0.30, more preferably not less than 0.35, and preferably not more than 0.50, more preferably not more than 0.45. Owing to the outer shoulder blocks 38, a superior wandering performance can be exhibited while suppressing uneven wear of the block.

Preferably, each of the outer shoulder blocks 38 is provided with a plurality of outer shoulder sipes 39 communicating between the shoulder narrow groove 8 and the tread ground end Te. The outer shoulder sipes 39 may improve on-ice performance.

Preferably, an interval P4 between a pair of circumferentially adjacent outer shoulder sipes 39 and 39, for example, is in a range of from 1.15 to 1.35 times of the interval P2 (shown in FIG. 2) of the outer central sipes 19. Furthermore, the interval P4 of the outer shoulder sipes 39 is preferably the same as the interval P3 of the inner shoulder sipes 34. Such an outer shoulder sipe 39 may offer an excellent wandering performance while suppressing uneven wear of the outer shoulder blocks 38.

As illustrated in FIG. 2, preferably, a shoulder auxiliary block 41 is provided on the axially outer side of the outer shoulder blocks 38. The ground contact surface 41s of the shoulder auxiliary block 41 is disposed radially inward of the ground contact surface 38s of the outer shoulder blocks 38. The shoulder auxiliary block 41 may disperse the ground contact pressure in the vicinity of the tread ground end Te when cornering to suppress a stepped wear of the outer shoulder blocks 38 effectively.

As illustrated in FIG. 1, when the tire is configured as a heavy duty pneumatic tire for winter such as in this embodiment, a land ratio Lr of the tread portion 2 is preferably not less than 68%, more preferably not less than 70%, and preferably not more than 78% more preferably not less than 75%. Thus, the wear resistance and the on-ice performance can be ensured. As used herein, the term "land ratio" means a ratio Sb/Sa of an actual total ground area Sb to a virtual ground surface total area Sa where all the grooves and sipes between the tread ground ends Te and Te is filled up.

The number of pitches N of each block included in the tread portion 2 is preferably not less than 40, more preferably not less than 45, and preferably not more than 60, more preferably not more than 55. Thus, an excellent edge effect can be obtained while ensuring rigidity of each block.

A rubber hardness Ht of the tread rubber is preferably not less than 60 degrees, more preferably not less than 63 degrees, and preferably not more than 70 degrees, more preferably not more than 67 degrees. Owing to the tread rubber, the wear resistance and the on-ice performance can be consistent. In the present specification, the "rubber hardness" is, in conformity to JIS-K6253, hardness by a durometer type A in the environment of 23 degrees C.

The summation central edge component amount ΣCE which is a sum of edge component amount of sipes provided in the central land portion 10 is preferably not less than 33,000 mm, more preferably not less than 35,000 mm, and preferably not more than 43,000 mm, more preferably not more than 40,000 mm. Thus, an excellent on-ice performance can be exhibited while ensuring rigidity of the central land portion 10. The edge component amount of sipes means a total sum of the lengths of the sides of the both edges of the sipes.

The summation shoulder edge component amount ΣSE which is a sum of edge component amount of sipes provided in the shoulder land portion 30 is preferably not less than 23,000 mm, more preferably not less than 25,000 mm, and preferably not less more 33,000 mm, more preferably not more than 30,000 mm. Thus, an excellent on-ice performance can be exhibited while ensuring rigidity of the shoulder land portion 30.

A ratio ΣSE/ΣCE of the summation shoulder edge component amount ΣSE to the summation central edge component amount ΣCE is preferably not less than 0.65, more preferably not less than 0.70, and preferably not more than 0.80, more preferably not more than 0.75. Accordingly, uneven wear of the central land portion 10 and the shoulder land portion 30 can be effectively suppressed.

Having described in detail a pneumatic tire of the present invention, the present invention is to be carried out by various modifications of the embodiments without being limited to the specific embodiments described above.

Example

Heavy duty pneumatic tires of a size 11R22.5 having the basic pattern of FIG. 1 were manufactured based on the specifications shown in Table 1. As Comparative Example 1, a tire having no central narrow groove was manufactured. As Comparative Example 2, regarding narrow grooves between the central main grooves, the tire which is provided with only a straight first central narrow groove was manufactured. Then, for each test tire, on-ice performance, on-snow performance, and wear resistance were evaluated. Common specifications and test methods for each test tire is as follows.

Rim: 8.25×22.5

Tire inner pressure: 900 kPa

Test vehicle: 10-ton truck, carrying 50% of the load of standard load capacity in carrier central Tire mounting position: all wheel On-Ice Performance:

On-ice performance was evaluated by a driver's feeling using the test vehicle fitted with the test tire. The results are indicated using a score wherein Comparative Example 1 is set to 100. The larger the value, the better the on-ice performance is.

On-Snow Performance:

On-snow performance was evaluated by a driver's feeling using the test vehicle fitted with the test tire. The results are indicated using a score wherein Comparative Example 1 is set to 100. The larger the value the better the on-snow performance is.

Wear Resistance:

On a dry road, the test vehicle fitted with each test tire was run a certain distance. Then, for the test tire after running, a wear amount of the central land portion was measured. The results are indicated using an index of a reciprocal number of the wear amount, wherein Example 1 is set to 100. The larger the value, the better the wear resistance is. Test results are shown in Table 1.

TABLE 1

| | Ref. Ex. 1 | Ref. Ex. 2 | Ex. 1 | Ex. 2 | Ex. 3 | Ex. 4 | Ex. 5 | Ex. 6 | Ex. 7 |
|---|---|---|---|---|---|---|---|---|---|
| First central narrow groove | Absence | Presence | Presence | Presence | Presence | Presence | Presence | Presence | Presence |
| Second central narrow groove | Absence | Absence | Presence | Presence | Presence | Presence | Presence | Presence | Presence |
| Groove width W2 of central narrow groove/groove width W1 of central main groove | 0.40 | 0.40 | 0.40 | 0.30 | 0.35 | 0.45 | 0.50 | 0.40 | 0.40 |
| Land ratio Lr (%) | 77.5 | 75.8 | 73.0 | 73.7 | 73.3 | 72.7 | 72.3 | 66.0 | 69.0 |
| Rubber hardness Ht of tread rubber (degree) | 65 | 65 | 65 | 65 | 65 | 65 | 65 | 65 | 65 |
| Number of pitch of block (number) | 50 | 50 | 50 | 50 | 50 | 50 | 50 | 50 | 50 |
| Summation central edge component amount ΣCE (mm) | 38000 | 38000 | 38000 | 38000 | 38000 | 38000 | 38000 | 38000 | 38000 |
| Summation shoulder edge component amount ΣSE (mm) | 28000 | 28000 | 28000 | 28000 | 28000 | 28000 | 28000 | 28000 | 28000 |
| Ratio ΣSE/ΣCE | 0.74 | 0.74 | 0.74 | 0.74 | 0.74 | 0.74 | 0.74 | 0.74 | 0.74 |
| On-ice performance [mark] | 100 | 102 | 105 | 103 | 104 | 105 | 107 | 103 | 104 |
| On-snow performance [mark] | 100 | 102 | 105 | 104 | 105 | 105 | 106 | 107 | 106 |
| Wear resistance [index] | 100 | 95 | 100 | 102 | 100 | 100 | 99 | 98 | 100 |

| | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| First central narrow groove | Presence | Presence | Presence | Presence | Presence | Presence | Presence | Presence | Presence |
| Second central narrow groove | Presence | Presence | Presence | Presence | Presence | Presence | Presence | Presence | Presence |
| Groove width W2 of central narrow groove/groove width W1 of central main groove | 0.40 | 0.40 | 0.40 | 0.40 | 0.40 | 0.40 | 0.40 | 0.40 | 0.40 |
| Land ratio Lr (%) | 77.0 | 80.0 | 73.0 | 73.0 | 73.0 | 73.0 | 73.0 | 73.0 | 73.0 |
| Rubber hardness Ht of tread rubber (degree) | 65 | 65 | 58 | 61 | 69 | 72 | 65 | 65 | 65 |
| Number of pitch of block (number) | 50 | 50 | 50 | 50 | 50 | 50 | 35 | 42 | 58 |
| Summation central edge component amount ΣCE (mm) | 38000 | 38000 | 38000 | 38000 | 38000 | 38000 | 38000 | 38000 | 38000 |
| Summation shoulder edge component amount ΣSE (mm) | 28000 | 28000 | 28000 | 28000 | 28000 | 28000 | 28000 | 28000 | 28000 |
| Ratio ΣSE/ΣCE | 0.74 | 0.74 | 0.74 | 0.74 | 0.74 | 0.74 | 0.74 | 0.74 | 0.74 |
| On-ice performance [mark] | 106 | 107 | 107 | 105 | 103 | 102 | 103 | 104 | 106 |
| On-snow performance [mark] | 104 | 102 | 105 | 105 | 105 | 104 | 105 | 105 | 105 |
| Wear resistance [index] | 100 | 101 | 99 | 100 | 102 | 103 | 104 | 102 | 100 |

| | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|
| First central narrow groove | Presence | Presence | Presence | Presence | Presence | Presence | Presence | Presence | Presence |
| Second central narrow groove | Presence | Presence | Presence | Presence | Presence | Presence | Presence | Presence | Presence |
| Groove width W2 of central narrow groove/groove width W1 of central main groove | 0.40 | 0.40 | 0.40 | 0.40 | 0.40 | 0.50 | 0.50 | 0.50 | 0.50 |
| Land ratio Lr (%) | 73.0 | 73.0 | 73.0 | 73.0 | 73.0 | 72.3 | 72.3 | 72.3 | 72.3 |
| Rubber hardness Ht of tread rubber (degree) | 65 | 65 | 65 | 65 | 65 | 65 | 65 | 65 | 65 |
| Number of pitch of block (number) | 65 | 50 | 50 | 50 | 50 | 50 | 50 | 50 | 50 |
| Summation central edge component amount ΣCE (mm) | 38000 | 45000 | 42400 | 34000 | 32000 | 38000 | 38000 | 38000 | 38000 |

TABLE 1-continued

| | | | | | | | | | |
|---|---|---|---|---|---|---|---|---|---|
| Summation shoulder edge component amount ΣSE (mm) | 28000 | 28000 | 28000 | 28000 | 28000 | 21660 | 24000 | 32000 | 35000 |
| Ratio ΣSE/ΣCE | 0.74 | 0.62 | 0.66 | 0.82 | 0.88 | 0.57 | 0.63 | 0.84 | 0.92 |
| On-ice performance [mark] | 107 | 107 | 106 | 104 | 103 | 102 | 103 | 104 | 105 |
| On-snow performance [mark] | 105 | 105 | 105 | 105 | 105 | 105 | 106 | 106 | 107 |
| Wear resistance [index] | 99 | 98 | 99 | 101 | 102 | 101 | 100 | 99 | 98 |

As is evident from Table 1, in the pneumatic tires of Examples, it was confirmed that the on-ice performance and the wear resistance are improved.

The invention claimed is:

1. A pneumatic tire comprising:
a tread portion being provided with a pair of circumferentially and continuously extending central main grooves on both sides of a tire equator, circumferentially and continuously extending central narrow grooves disposed axially inward of the central main grooves and having a groove width smaller than those of the central main grooves and a pair of circumferentially and continuously extending shoulder narrow grooves disposed axially outward of the central main grooves;
wherein:
the central narrow grooves comprising a first central narrow groove extending in a straight shape along a circumferential direction of the tire and a pair of second central narrow grooves each extending in a zigzag shape;
the first central narrow groove being disposed axially inward of the second central narrow groove;
the tread portion being provided with a pair of inner central land portions between the first central narrow groove and the second central narrow grooves, a pair of outer central land portions between the second central narrow grooves and the central main grooves, and a pair of inner shoulder land portions between the central main grooves and the shoulder narrow grooves;
each of the inner central land portions being divided into a plurality of inner central blocks by a plurality of inner central lateral grooves communicating between one of the second central narrow grooves and the first central narrow groove;
each of the outer central land portions being divided into a plurality of outer central blocks by a plurality of outer central lateral grooves communicating between one of the second central narrow grooves and one of the central main grooves;
each of the inner shoulder land portions being divided into a plurality of inner shoulder blocks by a plurality of inner shoulder lateral grooves communicating between one of the shoulder narrow grooves and one of the central main grooves;
a ground contact surface of each of the inner central blocks, a ground contact surface of each of the outer central blocks, and a ground contact surface of each of the inner shoulder block are each longer in the tire circumferential direction than in the tire axial direction;
a ratio $W6/L1$ of an axial width $W6$ to a circumferential length $L1$ of the ground contact surface of each of the inner central blocks is smaller than a ratio $W7/L2$ of an axial width $W7$ to a circumferential length $L2$ of the ground contact surface of each of the outer central blocks;
the ratio $W7/L2$ is smaller than a ratio $W12/L3$ of an axial width $W12$ to a circumferential length $L3$ of the ground contact surface of each of the inner shoulder blocks;
each of the outer central blocks is provided with a plurality of outer central sipes communicating between the second central narrow groove and central main groove adjacent to the outer central block;
each of the inner shoulder blocks is provided with a plurality of inner shoulder sipes communicating between the central main groove and shoulder narrow groove adjacent to the inner shoulder block; and
each of intervals $P3$ between the shoulder sipes is larger than each of intervals $P2$ between the outer central sipes.

2. The pneumatic tire according to claim 1, wherein the first central narrow groove is disposed on the tire equator, and a pair of the second central narrow grooves are disposed on both sides of the tire equator.

3. The pneumatic tire according to claim 1, wherein each of the inner central lateral grooves communicates between a first apex portion of one of the second central narrow groove which protrudes axially inwardly and the first central narrow groove, and the ground contact surface of each of the inner central blocks is substantially pentagonal.

4. The pneumatic tire according to claim 1, wherein the central main grooves have a zigzag shape, each of the outer central lateral grooves communicates between a second apex portion of one of the second central narrow grooves which protrudes axially outwardly and a first apex portion of the central main grooves which protrudes axially inwardly, and the ground contact surface of each of the outer central blocks is substantially hexagonal.

5. The pneumatic tire according to claim 1, wherein the shoulder narrow grooves extend in a zigzag shape in the circumferential direction of the tire.

6. The pneumatic tire according to claim 5, wherein the central main grooves have a zigzag shape, the inner shoulder lateral grooves communicates between a first apex portion of one of the shoulder narrow grooves which protrudes axially inwardly and a second apex portion of one of the central main grooves which protrudes axially outwardly, and the ground contact surface of each of the inner shoulder blocks is substantially hexagonal.

7. The pneumatic tire according to claim 5, wherein the tread portion is provided with a pair of outer shoulder land portion disposed axially outward of the shoulder narrow grooves, each of the outer shoulder land portions is divided into a plurality of outer shoulder blocks by a plurality of outer shoulder lateral grooves communicating between respective second apex portions of one of the shoulder narrow grooves which protrudes axially outwardly and a tread ground contact end, and a ground contact surface of each of the outer shoulder blocks is substantially pentagonal.

8. The pneumatic tire according to claim 7, wherein the ground contact surface of each of the outer shoulder blocks has a ratio $W13/L4$ of an axial width $W13$ to a circumferential length $L4$ in a range of 0.30 to 0.50.

9. The pneumatic tire according to claim 1, wherein a groove width $W10$ of each of the inner shoulder lateral grooves is larger than a groove width $W1$ of each of the central main grooves.

10. The pneumatic tire according to claim 1, wherein a groove width $W11$ of each of the outer shoulder lateral grooves is larger than a groove width $W1$ of each of the central main grooves.

11. The pneumatic tire according to claim 1, wherein the groove width $W3$ of each of the inner central lateral grooves is 1.65 to 1.85 times the groove width $W1$ of each of the central main grooves.

12. The pneumatic tire according to claim 1, wherein a groove width $W4$ of each of the outer central lateral grooves is 1.65 to 1.85 times a groove width $W1$ of each of the central main grooves.

13. The pneumatic tire according to claim 1, wherein
the tread portion is provided with a pair of outer shoulder land portion disposed axially outward of the shoulder narrow grooves, each of the outer shoulder land portions is divided into a plurality of outer shoulder blocks by a plurality of outer shoulder lateral grooves communicating between respective second apex portions of one of the shoulder narrow grooves which protrudes axially outwardly and a tread ground contact end, and the ratio W12/L3 is larger than a ratio W13/L4 of an axial width W13 to a circumferential length L4 of the ground contact surface of each of the outer shoulder blocks.

14. The pneumatic tire according to claim 1, wherein
the tread portion is provided with a pair of outer shoulder land portion disposed axially outward of the shoulder narrow grooves, each of the outer shoulder land portions is divided into a plurality of outer shoulder blocks by a plurality of outer shoulder lateral grooves communicating between respective second apex portions of one of the shoulder narrow grooves which protrudes axially outwardly and a tread ground contact end, each of the outer shoulder blocks is provided with a plurality of outer shoulder sipes communicating between the shoulder narrow groove and tread ground contact end adjacent to the outer shoulder block, and each of intervals P4 between the outer shoulder sipes is larger than each of the intervals P2.

15. The pneumatic tire according to claim 1, wherein each of the intervals P3 is 1.15 to 1.35 times the each of the intervals P2.

16. The pneumatic tire according to claim 14, wherein each of the intervals P4 is 1.15 to 1.35 times the each of the intervals P2.

17. The pneumatic tire according to claim 1, wherein
each of the inner central blocks is provided with a plurality of inner central sipes communicating between the first central narrow groove and second central narrow groove adjacent to the inner central block, and each of intervals P1 between the inner central sipes is 0.05 to 0.20 times the circumferential length L1.

18. The pneumatic tire according to claim 1, wherein each of the intervals P2 is 0.05 to 0.20 times the circumferential length L2.

19. The pneumatic tire according to claim 1, wherein
each of the inner central blocks is provided with a plurality of inner central sipes communicating between the first central narrow groove and second central narrow groove adjacent to the inner central block, each of the outer shoulder blocks is provided with a plurality of outer shoulder sipes communicating between the shoulder narrow grooves and tread ground contact end adjacent to the outer shoulder block, and a ratio of the total length of edges of all of the inner shoulder sipes of the inner shoulder blocks and the outer shoulder sipes of the outer shoulder blocks to the total length of edges of all of the inner central sipes of the inner central blocks and the outer central sipes of the outer central blocks is in a range of 0.65 to 0.80.

20. The pneumatic tire according to claim 1, wherein a ratio W2/W1 between a groove width W2 of each of the central narrow grooves and a groove width W1 of each of the central main grooves is in a range of 0.30 to 0.50.

* * * * *